H. A. GRAY.
APPARATUS FOR RAISING SUNKEN VESSELS.
APPLICATION FILED FEB. 15, 1919. RENEWED DEC. 29, 1920.
1,367,250.
Patented Feb. 1, 1921.
3 SHEETS—SHEET 2.
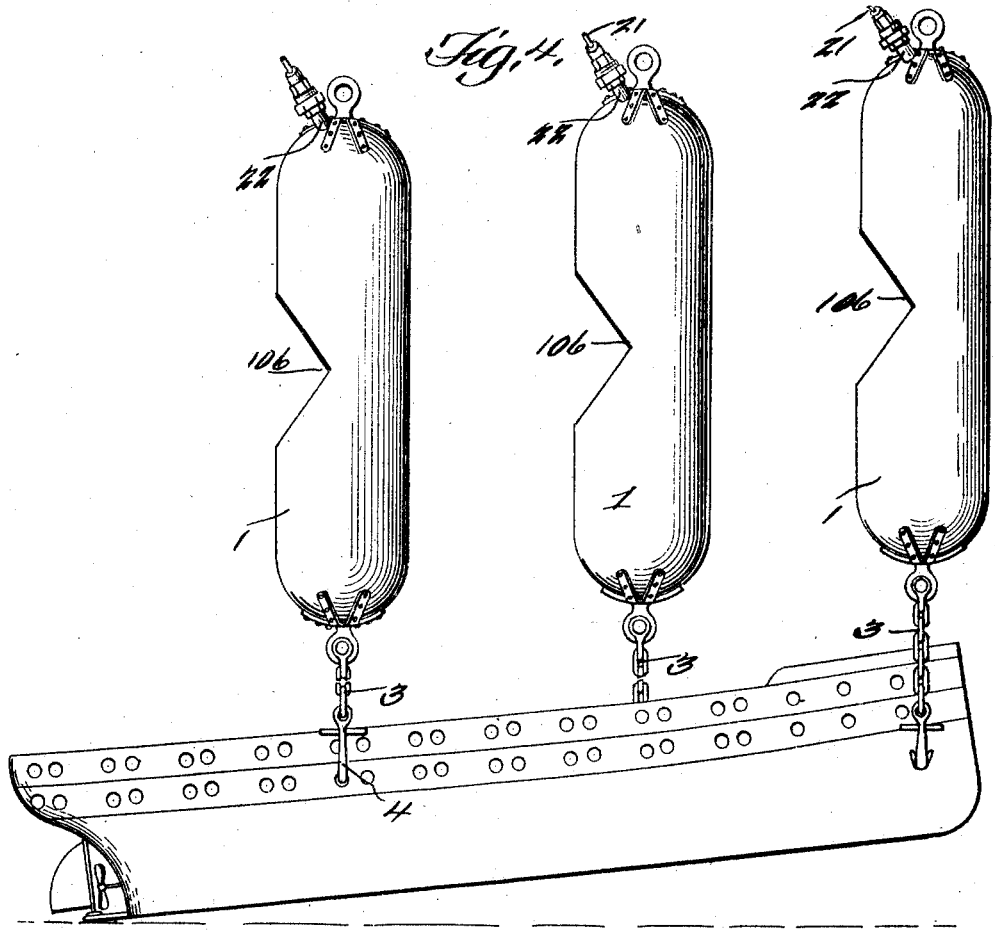
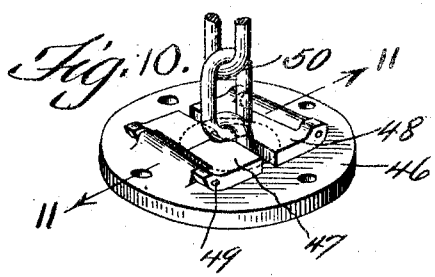
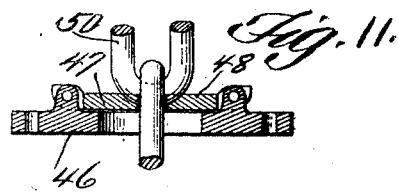
Inventor
Howard A. Gray,
Witnesses
By
Attorneys

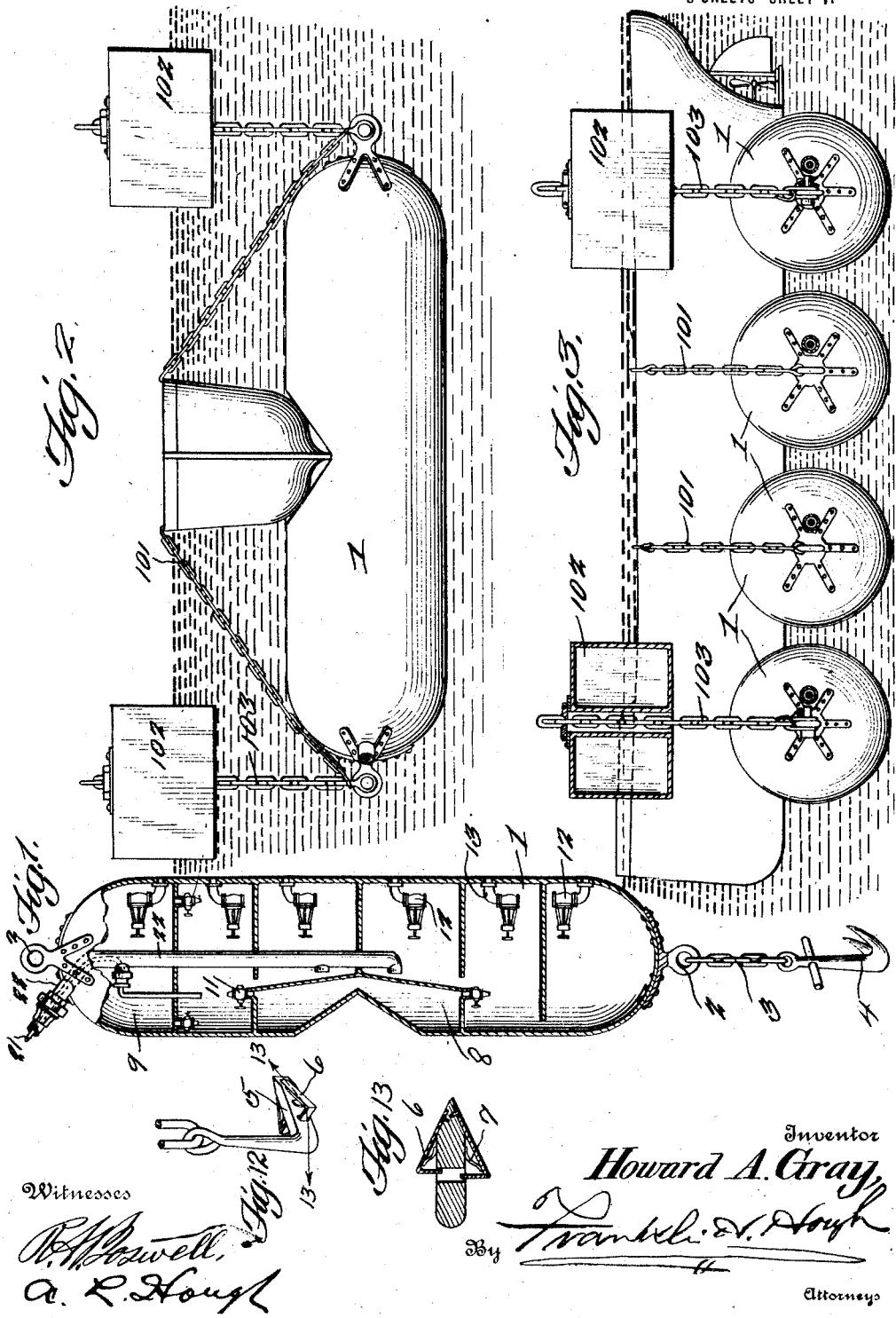

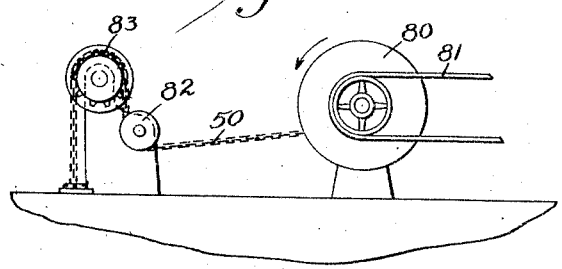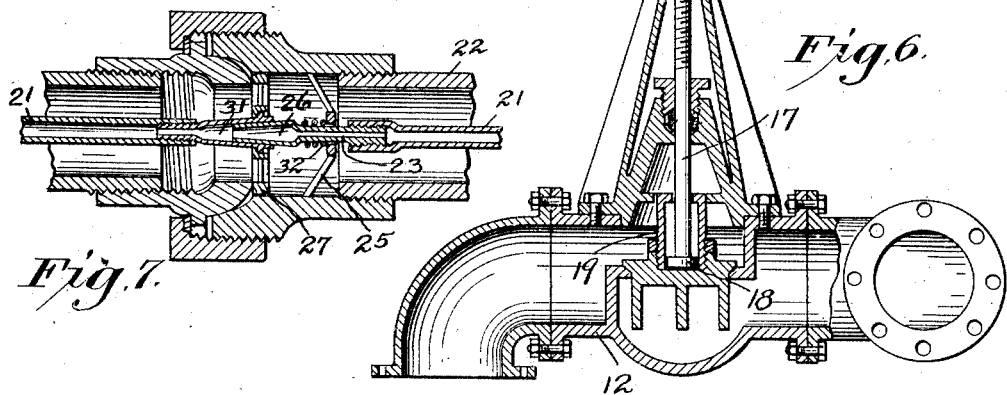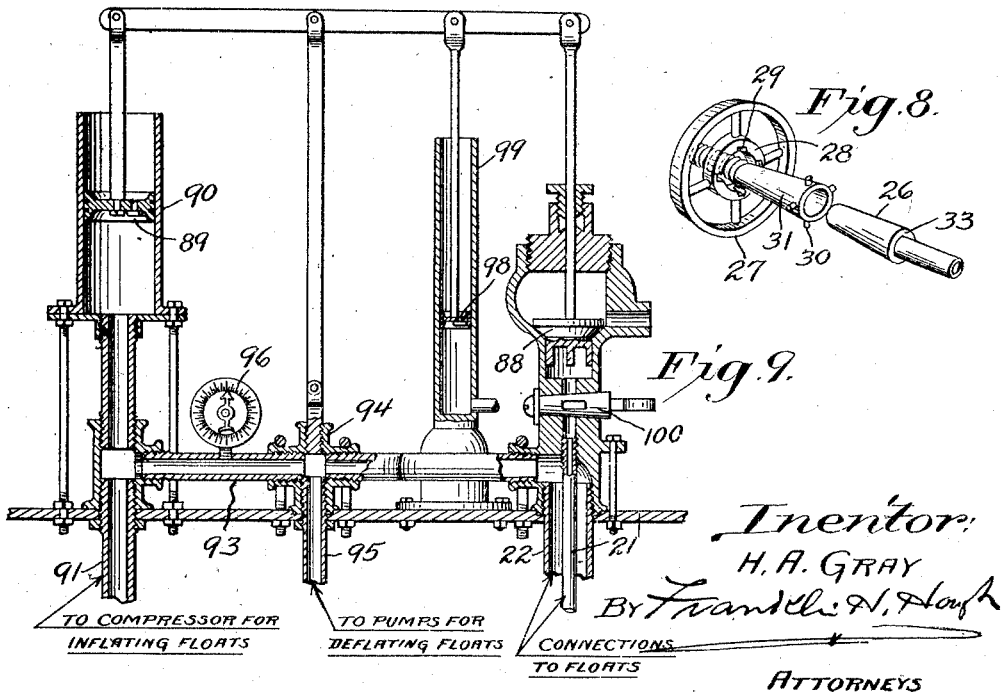

UNITED STATES PATENT OFFICE.

HOWARD A. GRAY, OF GODFREY, ILLINOIS.

APPARATUS FOR RAISING SUNKEN VESSELS.

1,367,250.     Specification of Letters Patent.     Patented Feb. 1, 1921.

Application filed February 15, 1919, Serial No. 277,217. Renewed December 29, 1920. Serial No. 433,914.

*To all whom it may concern:*

Be it known that I, HOWARD A. GRAY, a citizen of the United States, residing at Godfrey, in the county of Madison and State of Illinois, have invented certain new and useful Improvements in Apparatus for Raising Sunken Vessels; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for raising sunken vessels and consists essentially in the provision of means whereby a submersible float may be connected to any part of the sunken vessel lying upon the bed of the sea or other body of water, and when unwatered will lift the ship to permit elevating chains or cables to be placed underneath the same, after which the ship is raised to the surface of the water where it may be either towed ashore or placed in a floating dry dock.

The present invention consists of a simple and efficient device of this nature, having various details of construction, combination and arrangement of parts which will be hereinafter fully described, shown in the accompanying drawings and then specifically defined in the appended claims.

My invention is illustrated in the accompanying drawings which, with the letters of reference marked thereon, form a part of this application and in which:

Figure 1 is a central sectional view through a float with anchoring chain secured thereto for attachment to the sunken vessel.

Fig. 2 is a side elevation showing a vessel raised by floats to a location adjacent to the surface of the water.

Fig. 3 is a side elevation showing a plurality of the floats and the ship in elevation supported by the floats.

Fig. 4 is a side elevation showing a plurality of floats anchored to a ship with the bow slightly elevated.

Fig. 5 is an enlarged detail in elevation of a means for taking up slack of chain.

Fig. 6 is an enlarged detail view of a valve mounted in regulating openings in compartments of the float.

Fig. 7 is a central longitudinal view through hose pipes and connections.

Fig. 8 is a detail perspective of a hose connection.

Fig. 9 is an enlarged detail in section of means for controlling the watering and unwatering of the floats.

Fig. 10 is a detail view of a means for holding the slack in the cable.

Fig. 11 is a sectional view on line 11—11 of Fig. 10.

Fig. 12 is a detail perspective of a harpoon hook for engagement with the ship to be raised, and Fig. 13 is a sectional view on line 13—13 of Fig. 12.

Reference now being had to the details of the drawings by numerals:

1 designates a float, which may be of any size and preferably of the shape shown in the drawings. Said float has eyes 2 at its ends to which a chain 3 may be attached having a hook 4 secured thereto. In Figs. 12 and 13 I have shown a slight modification of the hook, as designated by numeral 5, and which is of harpoon shape, having wings 6 with springs 7 for holding the same at the position shown in Figs. 12 and 13 of the drawings. Said hooks of either type are adapted to be caught into the port holes or other parts of the ship to be raised, as shown in Fig. 4 of the drawings, the hooks being connected to the ship in any suitable manner, as by submarines, &c.

Numerals 8 and 9 designate air spaces which may be selectively charged with air while the balance of the float is watered, in order to cause the float to submerge either horizontally of vertically as may be required, that is to say, if the space 9 is unwatered and the remaining interior space watered the buoyancy of the chamber 9 will be sufficient to hold the float in vertical position, as in Fig. 1, but not prevent submerging, whereas if the chamber 8 is unwatered and the remaining space watered, the float will submerge in a horizontal position. Said air compartments are provided with stop cocks 11 and the stop cocks of either one of the compartments may be closed and this compartment thus sealed, while the stopcocks of the other compartment may be opened, so that this compartment may be watered with the balance of space within the float. It will be noted that the float is divided into compartments for the purpose of distributing the bulk of water throughout the full length of the float when it is normally dewatered and when in a horizontal position. Each of said compartments is fitted with a valve, the casing of which is designated by numeral 12 and is secured to an elbow 13 formed in an opening in the wall of the compartment. The valve 12 may be a check valve of the type illustrated in Fig. 6, in which a rod 17 is shown mounted in a frame above the valve. The rod is screwthreaded through the frame and has an operating handle 20 and a head 18, by which the rod engages a tubular portion of the valve, when the rod 17 is screwed up the valve is unseated and when screwed down the valve may be permanently seated. If the rod is set in intermediate position the valve is free to move from its seat when the internal pressure is greater than the external pressure but is held in its place at other times. The float is provided with double watering and unwatering pipes 21 and 22. Said pipe 21, which is for air induction and eduction, opens through the wall of the pipe 22 into the interior of the float, as shown in Fig. 1 of the drawings. It will be understood that the float when below the surface of the water can only be watered in proportion to the rapidity with which the air is allowed to escape, as the air pressure must be maintained within the float equal to the pressure of water on the exterior.

The connections between the pipes 21 and 22 are shown in detail in Fig. 7 of the drawings, in which the pipe 21 is connected to a tube 23 passing through an aperture in a spider 25, and said tube has a conical shaped portion 26 which passes through a skeleton spider disk 27, a detail of which is shown in Fig. 8 of the drawings, and which disk is provided with a hub portion 28 centrally apertured and provided with recesses 29 adapted to receive lugs 30 projecting from the circumference of a conical shaped tubular member 31 which receives the conical shaped member 26. A coiled spring 32 is mounted between the spider disk 25 and a shoulder 33 and tends to hold the members 31 and 26 in telescoped relation. Another section of the pipe 21 is connected to the contracted end of the tubular shell portion 31, as shown clearly in Fig. 7 of the drawings.

In the initial watering for submerging either the chamber 9 or the chamber 8 is left unwatered for the purpose of maintaining the correct poise of the float. The remaining space in the float is watered by opening the appropriate valves 12 permitting the inflow of water, the air escaping through the pipe 21. This initial watering of the float is accomplished by manual actuation of such of the valves 12 as may be required for filling the appropriate space, or spaces, within said float. After the float has thus been filled, the valves 12 are set at "check" position, which permits the outflow of water, or prevents the inflow. When the float has been connected with the hull to be raised, it is necessary to dewater the float to make available the buoyancy. This is accomplished by the employment of the compressed air from the compression tank, not shown, but as indicated in Fig. 9. Air from the compressor passes through the pipes 91, 93 and 22 to the float, forcing the water out through the check valves 12 until the float is entirely dewatered. In this position it is in condition to exert its greatest buoyancy. It becomes necessary, however, at times in the practice of raising sunken vessels with this apparatus to rewater the float for the purpose of sinking, or to water to a certain extent to provide for sinking to a certain depth, or raising to a certain depth. This rewatering, or further dewatering is accomplished also by the use of the valve structure shown in Fig. 9. In case rewatering is required, water from the tank through pipe 95 is supplied, also through the pipe 93, and pipe 22 to the float, the air imprisoned within the float escaping through the pipe 21 to the valve 88. As has been heretofore disclosed, water from the pump is also introduced into the cylinder 99 to act against the piston 98, so that when the pump is in operation the valve 88 is raised to permit the escape of air from the pipe 22, but when the water is being discharged from the float, as heretofore described by air from the compressor through the pipe 91, such air acts against the piston 89 to hold the piston 88 to seat, thereby preventing the escape of air from the float. This may also be accomplished, of course, with the closing of the valve 100. By the use of the valve structure in its organized entirety, as shown at Fig. 9, the watering and dewatering of this submerged float is always under the control of the operator.

In Fig. 5 of the drawings I have shown means for hoisting the cables 50, consisting of a reel 80 driven by belted connection 81 with any suitable power apparatus, each cable passing about pulleys 82 and 83, said reel, belt 81 and pulleys being supported upon the salvaging ship (not shown).

Referring to Fig. 9 of the drawings, 88 designates an air relief valve, which is held upon its seat by an equal pressure upon the piston 89 in the cylinder 90 which has pipe connection 91 adapted to be connected to a compressor, not shown, whereby the floats may be unwatered to cause them to rise. The pipes 22 and 91 are connected by transversely disposed pipes 93 connected to a union 94 from which a pipe 95 leads which is adapted to communicate with a pump (not shown) for watering the float. The pipe 93 has a pressure gage 96 which is provided to show pressure on floats and the approximate depth of the floats. The piston 98 in the cylinder 99 working from the pressure of the pump assists the piston of the valve 88 in overcoming the force of piston 89, thereby allowing air to escape from the tube 21 through the valve 88 at each pulsation of the pump, the escape of air being regulated by valve 100.

It will be understood that the structure shown in Fig. 9 is supported upon the salvaging vessel (not shown).

Referring to Fig. 2 of the drawings, it will be seen that guy chains 101 which are fastened to the lower ends of the chains 103 and to the opposite sides of the ship which has been elevated by the floats 1, are adapted to hold the ship in a horizontal position. The chains 103 pass through balancing floats 102, provided with means such as shown in Figs. 10 and 11 for holding said chains at any position of raised adjustment, consisting of centrally apertured plates 46 which are fastened with their central apertures registering with passages through the floats. Upon each plate 46 are pivotally mounted upon the pins 49, the jaws 47 and 48 for engaging links of the hoisting chain 50 to hold the chain in different adjusted positions.

In operation, the floats 1 are submerged by filling with water and the hooks 4 connected by chains to the lower end thereof and are caught in the port holes of the ship to be raised, in the manner shown in Fig. 4 of the drawings, or to any other parts of the ship, and through the pipe connections the water is driven from the floats and one end of the ship elevated sufficiently permitting elevating cables to be placed underneath the same, for the purpose of raising the salvaged vessel to the surface of the water, after which the floats, which were previously used to elevate one end of the ship from the bottom of the sea, are placed underneath the ship, the latter resting in the notches 106 formed in the floats 1, which floats 1 will now support the ship near the surface of the water.

The ship being raised to the surface of the water, the same may be transferred into a floating dry dock, or towed upon the surface of the water to a dry dock upon shore.

What I claim to be new is:

1. An apparatus for raising sunken ships, comprising a submersible float provided with a transversely extending V-shaped trough for cradling a sunken ship.

2. An apparatus for raising sunken ships, comprising a submersible float provided with a transversely extending V-shaped trough for cradling a sunken ship, and means carried by said float and attachable to a sunken ship supportable in said trough for holding the ship against sidewise tilting movement.

3. An apparatus for raising sunken ships, comprising a submersible hollow float, provided with a transversely extending V-shaped trough for cradling a sunken ship, and partitions dividing said float into a plurality of chambers.

4. An apparatus for raising sunken ships, comprising a submersible hollow float, provided with a transversely extending V-shaped trough for cradling a sunken ship, and means for watering said float to submerge the same.

5. An apparatus for raising sunken ships, comprising a submersible hollow float, provided with a transversely extending V-shaped trough for cradling a sunken ship, and partitions dividing said float into a plurality of chambers, said chambers being provided with pipes extending through the longitudinal wall of the float for the purpose of watering the same.

6. An apparatus for raising sunken ships, comprising a submersible hollow float, provided with a transversely extending V-shaped trough for cradling a sunken ship, and partitions dividing said float into a plurality of chambers, said chambers being provided with pipes extending through the longitudinal wall of the float for the purpose of watering the same, and means for discharging water from said compartments.

7. An apparatus for raising sunken ships, comprising a submersible float, provided with a transversely extending V-shaped trough for cradling a sunken ship, and means carried by said float, and attachable to a ship cradled in said depression for preventing the tilting of said ship.

8. An apparatus for raising sunken ships, comprising a submersible float, provided with a transversely extending V-shaped trough for cradling a sunken ship, balancing floats coöperating with said submersible float, and connections between said submersible floats and said balancing floats, and passing through the latter.

9. An apparatus for raising sunken ships, comprising a submersible float, provided with a transversely extending V-shaped trough for cradling a sunken ship, balancing floats coöperating with said submersible float, and connections between said submersible floats and said balancing floats, and passing through the latter, and means for automatically holding said connections at any point of raised adjustment thereof.

In testimony whereof I hereunto affix my signature in presence of two witnesses.

HOWARD A. GRAY.

Witnesses:
 LILLIAN TALMAGE,
 H. A. TURNER.